(12) United States Patent
Doig

(10) Patent No.: US 11,037,363 B2
(45) Date of Patent: Jun. 15, 2021

(54) CONTENT MODIFICATION DEVICE AND METHOD

(71) Applicant: Sony Interactive Entertainment Inc., Tokyo (JP)

(72) Inventor: Jason Gordon Doig, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/624,504

(22) PCT Filed: Jun. 18, 2018

(86) PCT No.: PCT/GB2018/051679
§ 371 (c)(1),
(2) Date: Dec. 19, 2019

(87) PCT Pub. No.: WO2019/002825
PCT Pub. Date: Jan. 3, 2019

(65) Prior Publication Data
US 2020/0175749 A1    Jun. 4, 2020

(30) Foreign Application Priority Data
Jun. 30, 2017    (GB) ...................................... 1710484

(51) Int. Cl.
*G06T 15/20* (2011.01)
*G06T 5/00* (2006.01)
(Continued)

(52) U.S. Cl.
CPC .............. *G06T 15/20* (2013.01); *G06T 5/009* (2013.01); *G06T 15/04* (2013.01); *G06T 15/506* (2013.01); *G06T 2207/20208* (2013.01)

(58) Field of Classification Search
None
See application file for complete search history.

(56) References Cited

U.S. PATENT DOCUMENTS 9,171,402 B1    10/2015  Allen
2005/0032574 A1*   2/2005  Ohta ...................... G06T 15/50
                                                       463/31
(Continued)

FOREIGN PATENT DOCUMENTS

WO        2012140397 A2    10/2012

OTHER PUBLICATIONS

Combined Search and Examination Report for corresponding GB Application No. 1710484.1, 5 pages, dated Dec. 12, 2017.
(Continued)

*Primary Examiner* — Frank S Chen
(74) *Attorney, Agent, or Firm* — Matthew B. Dernier, Esq.

(57) ABSTRACT

A content modification system for modifying computer-generated content, the system including a rendering unit operable to render an image for display in dependence upon content to be rendered, an information output unit operable to output viewpoint data for the rendered images, the viewpoint data comprising information enabling the viewpoint to be reconstructed at a later time, a viewpoint reconstruction unit operable to generate an image to be displayed using the outputted viewpoint data, an image modifying unit operable to modify the generated image; and a content modifying unit operable to modify the content to be rendered in dependence upon the modifications to the generated image.

13 Claims, 5 Drawing Sheets

(51) Int. Cl.
*G06T 15/04* (2011.01)
*G06T 15/50* (2011.01)

(56) References Cited

U.S. PATENT DOCUMENTS

| | | | |
|---|---|---|---|
| 2011/0285822 A1 | 11/2011 | Dai | |
| 2013/0100123 A1 | 4/2013 | Hakoda | |
| 2013/0120367 A1 | 5/2013 | Miller | |
| 2014/0333611 A1* | 11/2014 | Marvie | G06T 15/00 345/419 |
| 2014/0354645 A1 | 12/2014 | Imber | |
| 2014/0354673 A1* | 12/2014 | Wang | G06T 11/60 345/589 |
| 2017/0116737 A1 | 4/2017 | Imber | |

OTHER PUBLICATIONS

International Search Report and Written Opinion for corresponding PCT Application No. PCT/GB2018/051679, 13 pages, dated Sep. 20, 2018.

Marcus Fairs, "Virtual reality will be 'more powerful than cocaine'", dezeen.com, [online] Available from: https://www.dezeen.com/2015/04/27 /virtual-realityarchitecture-more-powerful-cocaine-oculus-rift-ty-hedfan-olivierdemangel-ivr-nation/ 2 pages,(Apr. 27, 2019).

Building Construction Design, "Virtual reality design consultancy launches to revolutionise architecture and design process", buildingconstructiondesign, co., uk, [online] Available from: http://www.buildingconstructiondesign.co.uk/news/virtual-realitydesign-consultancy-launches-revolutionise-architecture-design-process/ 11 pages, (Sep. 15, 2016).

Communication pursuant to Article 94(3) for corresponding EP Application No. 18734912.1, 5 pages, dated Mar. 15, 2021.

\* cited by examiner

300

CONTENT MODIFICATION DEVICE AND METHOD

BACKGROUND OF THE INVENTION

Field of the invention

The present disclosure relates to a content modification device and method.

Description of the Prior Art

In many films and television programmes filmed in recent years it has become commonplace to perform a colour grading method to alter the colour palette within a piece of video content. This may be to avoid content having a washed out feel, or to otherwise improve the quality of the content. Alternatively, colour grading may be performed in order to evoke particular emotions or generate a particular feel within a scene. This may be performed on a frame-by-frame basis, or for any sized portion of the content (such as for each scene).

For example, by varying the colour palette so as to use 'warmer' colours (such as orange and red) it is possible to make a scene appear more inviting and/or evoke more positive emotions from a viewer in contrast with a scene that is predominantly displayed with 'colder' colours (such as blue and grey).

Such methods are advantageous in that they give a producer much more control over the appearance of content that is being filmed, and may also reduce the burden on a lighting crew or set designers in working to obtain the desired effect—as the desired effects may be added retrospectively.

Current colour grading methods for film content are generally based around dedicated software for performing the task. The software performs a colour grading method for sequences of or individual video frames by importing the frames, applying a variety of editing operations to alter the colours, and then exporting the altered video sequences or frames.

In addition to colour grading methods, tone mapping may be performed on content so as to reduce a high dynamic range image to a compressed dynamic range. This is performed in order to obtain an image that is more suitable for display on a typical screen; even modern HDR-enabled displays cannot display the same ranges as real light sources emit. One example of tone mapping is that of reducing an exposure value, so as to reduce the brightness of a scene.

More recently, similar methods have been applied to video games in order to achieve the same effects. Rendered samples of gameplay may be used to represent the whole game; this may be necessary in many cases as, because the content is interactive, it may not be possible to view every possible frame as in the processing of video content (for example, as a result of having a movable viewpoint).

Colour grading methods for real-time content are generally based around superimposing a lookup table on individual frames of the content and processing them in the same manner as film or still image content. The frames may be selected specially to representative, or simply taken to be representative, of the content on a larger scale (such as a particular scene or the whole piece of content). The lookup table is affected by the colour grading that is applied to the frame as a whole, and thus by comparing the superimposed lookup table to a reference table it is possible to derive which effects have been applied to the frames. Having derived which effects were applied, the effects can be approximated in real-time.

However, such a method does not necessarily provide a suitable colour grading solution for interactive content such as games or 3D environments. One reason for this is that a viewer may experience a far greater range of viewpoints as a camera is often movable, and a game (with fifty hours of gameplay, for example) may span a far greater range of environments than a two hour movie and therefore require a much more detailed treatment rather than a single colour grading. In addition to this, each player may have a different game experience; for example, two players may perform the same actions at different in-game times and/or using different viewpoints, and each of these may benefit from a different colour grading and tone mapping.

It is in view of these deficiencies that the present arrangement is proposed.

SUMMARY OF THE INVENTION

This disclosure is defined by claims 1 and 13, with further respective aspects and features of the disclosure defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
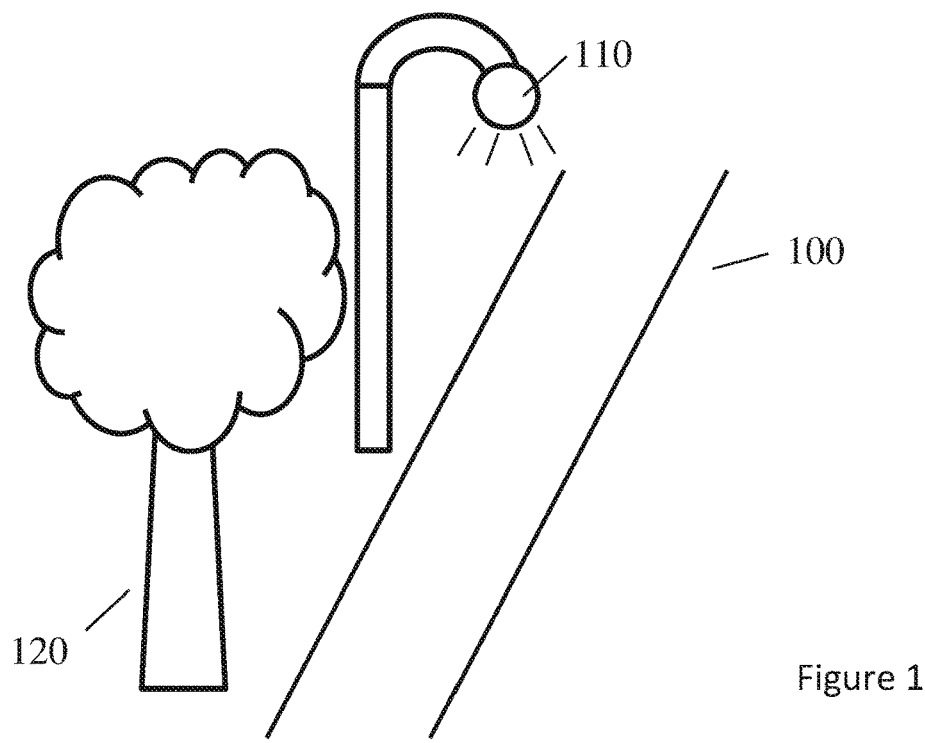
FIG. 1 schematically illustrates a virtual scene.

Referring now to the drawings, wherein like reference numerals designate identical or corresponding parts throughout the several views, an exemplary virtual scene is illustrated in FIG. 1, comprising a path 100, streetlight 110 and tree 120. Of course, in more general use cases a more complex virtual scene may be presented to the user comprising a greater number of objects and the like. The viewer may be presented with this scene occupying the whole of their view, or only a portion of the scene (such as that corresponding to a viewer's head position or an otherwise-requested viewpoint) may be displayed at any given time.

The viewer may be able to move their head or otherwise input commands to change the viewpoint and cause a different scene or portion to be displayed.

In a virtual scene such as this, different effects may be obtained using a colour grading method as described above. For example, by varying the brightness and applying an orange hue the scene may appear to be occurring at sunset; by increasing the brightness, it may appear as if the scene is occurring at midday. In contrast to this, a darker colour palette may make the scene appear overcast and may generate a sense of foreboding that may be desirable in a horror film or the like.

The information describing such a scene may be stored in any suitable manner; for example, a plurality of meshes and textures may be used to describe the scene, and any desired viewpoint may be generated from this mesh and texture data.

Figure 2:
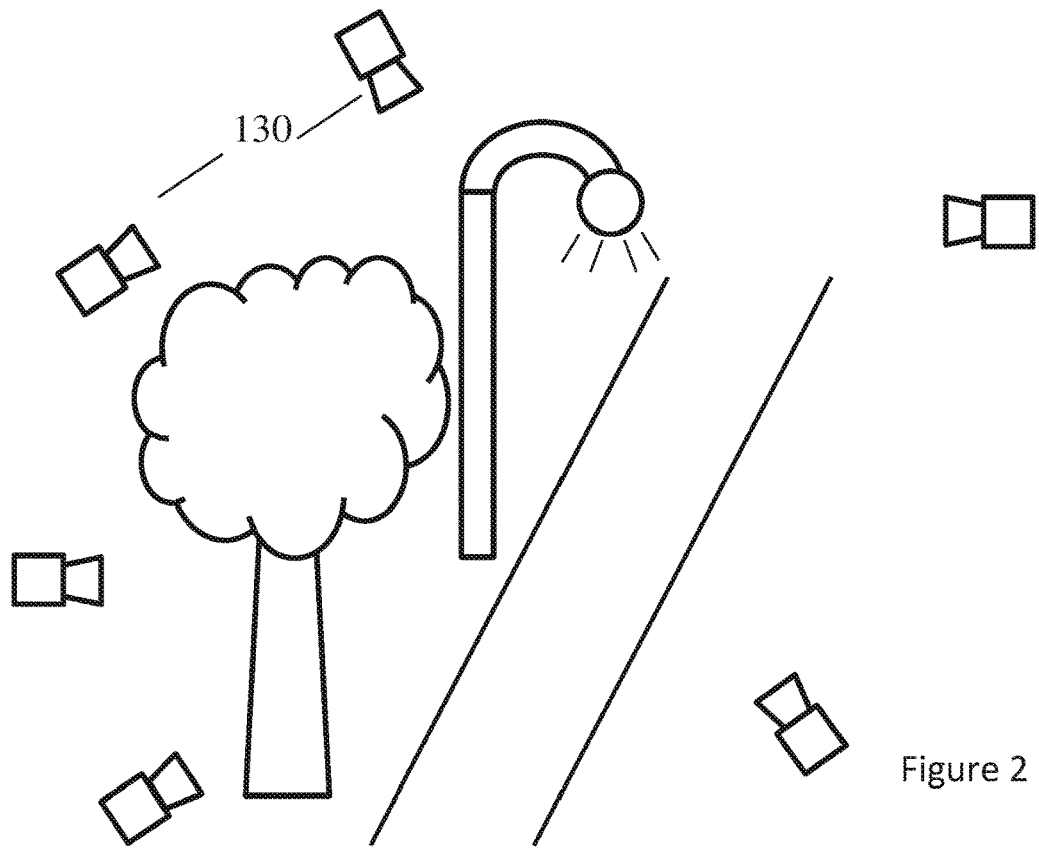
FIG. 2 schematically illustrates virtual cameras arranged in a virtual scene.

FIG. 2 schematically illustrates the placement of a plurality of virtual cameras 130 (each defining a viewpoint) in a virtual scene described by content to be rendered. The virtual cameras 130 are used to capture images of the virtual scene from a plurality of different positions and orientations.

The position and orientation of the cameras 130 as shown in FIG. 2 are entirely exemplary, as the cameras 130 may be placed in any appropriate location or orientation so as to provide a good level of coverage of at least important elements within the scene. By using a plurality of cameras, occlusion of parts of a virtual scene resulting from only considering a single viewpoint may be eliminated.

The location and orientation of the virtual cameras 130 may be determined by a user, for example to provide a view of key objects/areas within the scene. Alternatively, or in addition, virtual cameras 130 may be placed and oriented automatically by the system. This may be entirely arbitrary, or in response to some determination of key viewpoints or objects (for example, based on user play-through data or data that indicates the importance of particular objects within a scene) to indicate high-priority parts of the scene. For example, play-through data of one or more users could be analysed to identify the most common viewpoints in a piece of content, and the virtual cameras could be arranged to represent these.

Each of the virtual cameras 130 may capture a unique viewpoint in a scene, in addition to any metadata that may be useful. Examples of metadata include a timestamp, camera location information, and scene IDs. One example of a use for such metadata is to provide the ability to reconstruct the viewpoint at a later time (such as during the editing process in which colour grading is applied). The viewpoint and metadata may be output constantly, upon request by an editing application, or any other frequency. The viewpoint may serve as a preview of the scene that the metadata corresponds to, or may be used as a reference image to which modifications could be applied so as to preview changes without having to reconstruct the whole virtual scene.

In addition to this, data about the overall colour of the scene may be output. This may comprise frequency and brightness information for one or more viewpoints within the scene, for example.

Figure 3:
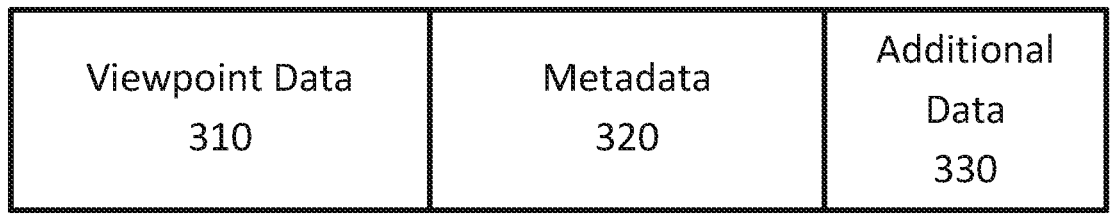
FIG. 3 schematically illustrates a data structure.

FIG. 3 schematically illustrates a data structure that may be used for outputs of information as described above. The data structure 300 comprises a viewpoint data field 310, a metadata field 320 and an additional data field 330.

The viewpoint data field 310 is used to transmit image and/or scene data related to the current viewpoint. This may comprise, for example, a screenshot of the current display and any information defining the camera viewpoint within the scene. Additional data about what objects or other elements are included in the scene may also be included in this field 310, such as contents of the z-buffer and texture data. In some embodiments, the viewpoint data comprises information describing lighting conditions within a virtual scene described by the content to be rendered.

The metadata field 320 is used to store information that enables the viewpoint to be reconstructed at a later time. For example, this may be metadata relating to in-content event information, general game state information, timestamps, on-screen objects, or any other reference information that may be used to identify the content that is being displayed at the time that the viewpoint is recorded. It need not be necessary to use this information to directly reconstruct the viewpoint, as it may be possible that the information is merely sufficient to allow the generation of an identical scene using a game engine or other suitable content generator.

The additional data field 330 may be used to store any further information that may be useful for the editing process; for example, information about effects that have already been applied, events occurring in the content, information about viewer actions (such as viewpoint changes), number of light sources in a scene, or information about a target mood or the like.

Of course, any other suitable data structure may be used to store and transmit information about the viewpoints that are being considered; that shown in FIG. 3 is intended only as an exemplary data structure.

Figure 4:
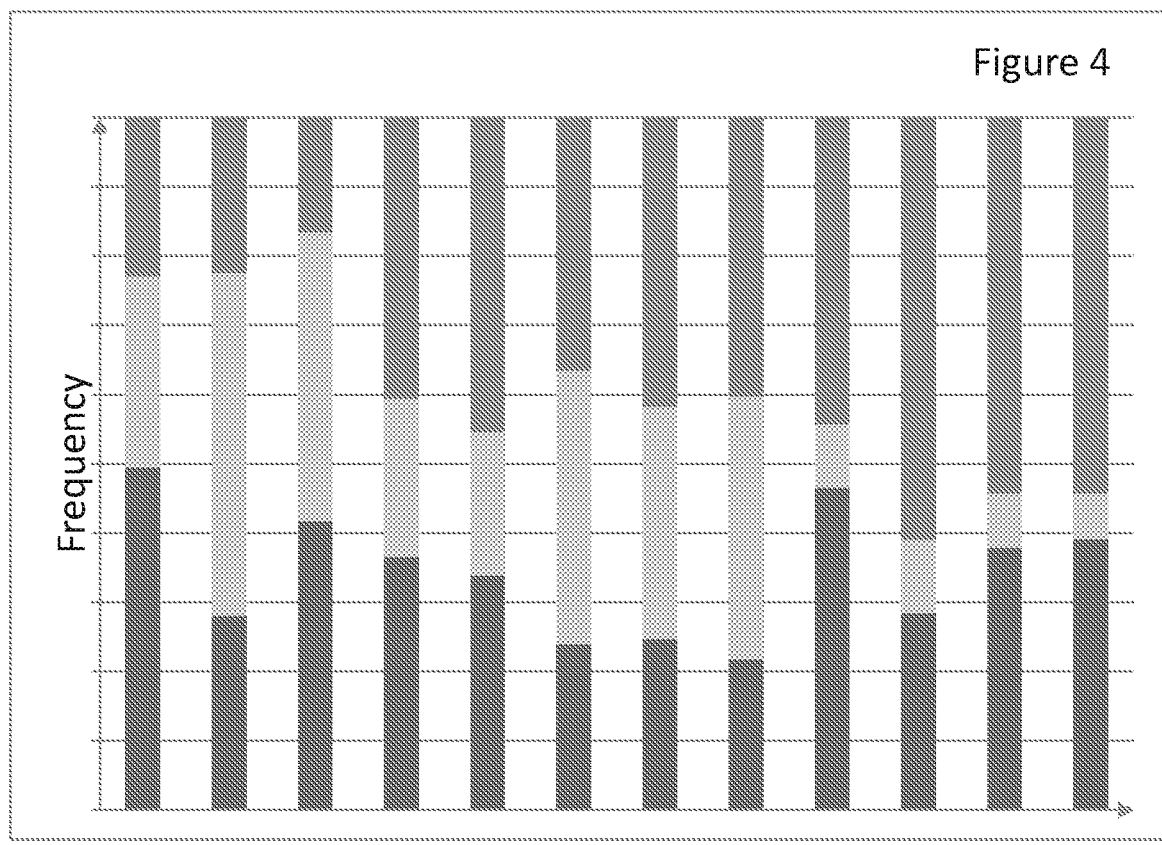
FIG. 4 schematically illustrates a colour data graph.

FIG. 4 schematically illustrates graph data derived from the images captured by virtual cameras within the virtual scene or scenes. Each bar may be indicative of a different viewpoint from the same scene, or of a different scene entirely (such as successive frames or frames otherwise separated by the time at which they would normally be displayed). The darkness (or intensity) of each portion of the bar is used to indicate the brightness, or contribution to an image, of the corresponding frequency of light in an image of a virtual scene. Of course, any suitable method of displaying such information may be used instead of that shown in this Figure; for example, a three-dimensional graph may be used in which the height is used to represent brightness rather than intensity of a line at a point.

Each bar may represent a single viewpoint from each virtual scene, such as for a preferred virtual camera position and/or orientation or simply a viewpoint that is considered to be representative of the scene. Alternatively, each bar may comprise averaged data for a plurality of viewpoints of that scene.

FIG. 4 represents colour data for images in which there is a relatively even distribution of colours over the image (as the intensities of each part of each bar are not dissimilar). The image is comprised mostly of low frequency colours (such as red), with slightly fewer high-frequency colours (such as blue) and then slightly fewer mid-frequency colours (such as green). This could represent the scene in FIG. 2, in which the only green is from the tree leaves, low-frequency contributions could be from the tree trunk and other red/orange/brown objects (such as if the path is a dirt track), and a blue sky accounts for the higher contribution from high-frequency colours such as blue.

Such a graph is an example of a representation of information describing lighting conditions, such as that derived from viewpoint data. As noted above, the information may be represented using a graph that comprises information about a plurality of viewpoints of a single scene, or information about a plurality of viewpoints representing scenes at different times. These are examples of information describing lighting conditions being represented by data that comprises information about a plurality of related viewpoints; the viewpoints are related either by corresponding to the same scene, or being related to each other by sequence, in these examples.

In a graph in which each bar represents a different viewpoint in the same scene, it is possible to identify viewpoints within the virtual scene which do not have similar colour characteristics to the other viewpoints. For example, particular objects which may not be visible from a first viewpoint (and as such may be missed if considering only a single viewpoint) may need to be modified in order to achieve a desired effect—such a representation may assist in identifying such objects.

A graph in which each bar represents a different virtual scene (or the same scene at a different time) may be more useful in ensuring the continuity of a colour effect over several frames, a scene, or any other period of time. This may be important in maintaining a mood throughout a piece of content, for example.

In either case, such a representation is advantageous in that it immediately indicates to a user how related viewpoints and/or earlier or later frames are affected by performing such any modifications to the scene.

In response to a determination that the lighting in a scene should be modified, several actions may be performed so as to implement changes to the scene. The first of these, discussed with reference to FIG. 5, comprises the movement or adjustment of light sources within a virtual scene in order to obtain a desired effect. A second method is that which is discussed with reference to FIG. 6; this comprises applying a colour grading and/or tone mapping process to a virtual scene such that the effects may be incorporated either before or after rendering has been performed to generate output video for display to a user. These methods may be applied individually, or in conjunction with one another in order to achieve a desired effect.

Figure 5:
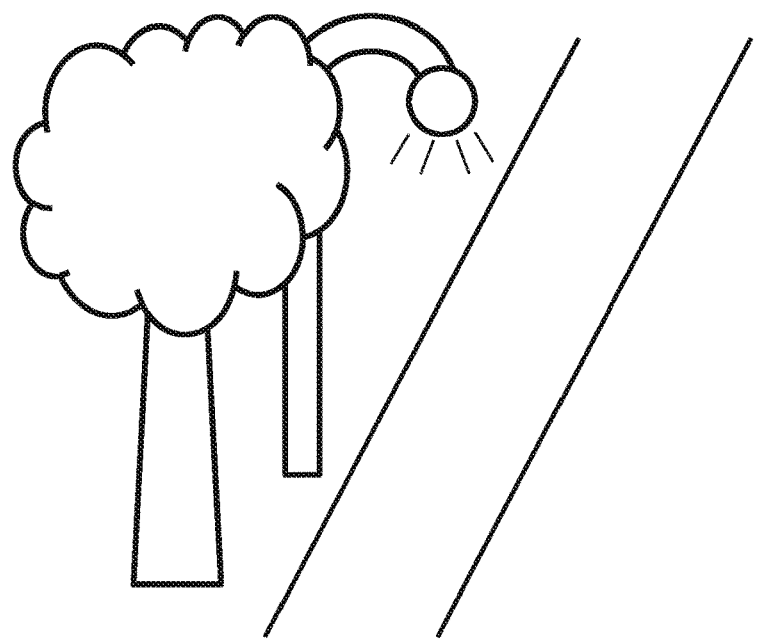
FIG. 5 schematically illustrates a modified virtual environment.

FIG. 5 schematically illustrates an embodiment in which light sources are moved in order to generate the desired lighting effect. In this example, the streetlight 110 has been moved closer to the tree 120. In many viewpoints within the virtual scene, this causes a greater occlusion of the light source—this results in a darker appearance of the scene, which may change the feel of the scene as desired. In other viewpoints (such as one in which the streetlight 110 appears in front of the tree 120) this may make little difference, although the proximity of the tree 120 to the light source 110 may result in more diffuse light in the environment, which may alter the appearance of reflections and ambient lighting even if it does not affect the light transmission directly.

Alternatively, or in addition, the output characteristics of the light source may be modified so as to vary (for example) the brightness, colour, or intensity of the output light. For example, rather than moving the streetlight 110 in the virtual scene, the output light could be dimmed or given a different colour characteristic so as to achieve similar results. This can be performed by modifying the program code used to generate the virtual scene. Modification of the program code could be performed manually, or using an editing suite or the like that allows a user to manipulate objects within a virtual scene directly.

An implementation such as this is advantageous relative to performing a colour grading process on each frame (as in standard video editing), as a direct modification to the virtual scene may require less processing and is independent of the particular viewpoint on which a colour grading process would otherwise be performed. Such a modification is generally not available to standard video editing without reshooting video content with modified/relocated light sources. Such an implementation may also provide more visually pleasing results, as rather than re-colouring a whole scene only relevant elements in the scene are modified.

In some embodiments, it may be advantageous to implement changes on a per-viewpoint basis or the like such that the modification of the content to be rendered is dependent on a viewpoint for which the content is to be rendered. For example a light source may be adapted for providing the desired light effects from a particular range of viewpoints, which may cause the lighting from other viewpoints to be undesirable.

To provide an example in the context of the scene shown in FIG. 1, the output light characteristics of the streetlight 110 may be modified to increase the brightness such that a viewer the other side of the tree 120 from the streetlight 110 is presented with a suitably bright image. However, as a result of this change, a viewer who has an unobstructed view of the streetlight 110 may find that the light is too bright; however calibrating the light source for such a viewpoint will cause the first viewpoints to be degraded. It may therefore be appropriate to define the brightness in a binary manner; higher for the viewpoints which do not have a direct view and lower for those viewpoints which do.

It is therefore apparent that the output light characteristics of a light source may be defined with an angular dependence (for example) in order to describe a range of viewpoints for which a particular set of characteristics are adopted.

Figure 6:
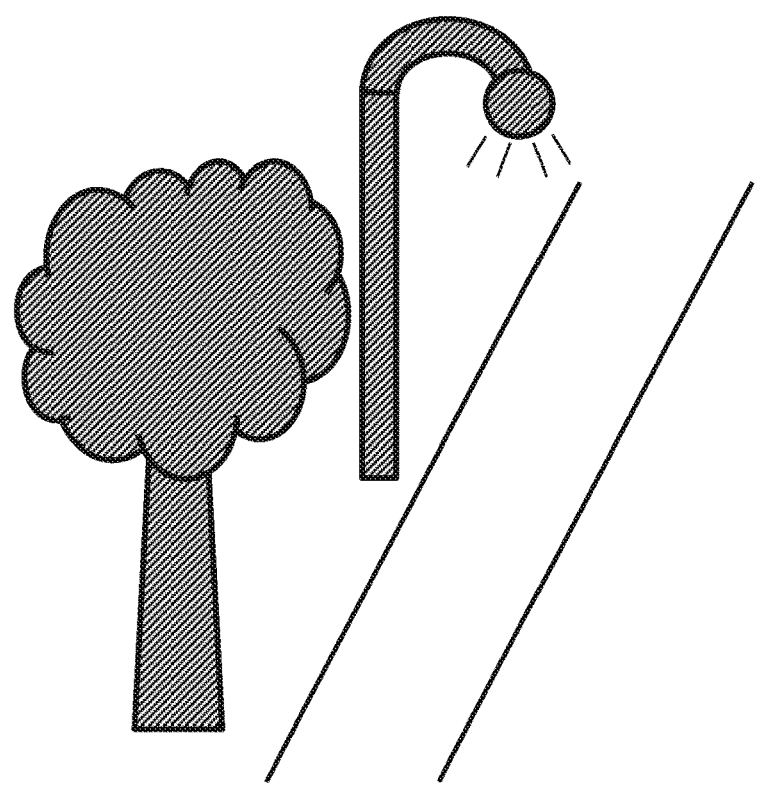
FIG. 6 schematically illustrates a colour graded virtual environment.

FIG. 6 schematically illustrates an alternative method for adjusting the lighting within the scene, one in which the colours within the scene are modified using colour grading and/or tone mapping operations. This may be performed in a number of ways; for example, a colour grading effect could be applied to the whole scene in a manner analogous to that used in film production. Alternatively, or in addition, the colours or other properties of the objects within the virtual environment may be varied so as to achieve the desired effect independent of viewpoint. As an intermediate (alternative or additional) method, a colour grading effect could be applied to each object within the virtual scene individually as desired.

In the example of FIG. 6, the scene has been darkened significantly; light colours are at least partially eliminated or reduced in favour of darker colours. For example, the darkness could result from an increase of dark blues in the image, indicating a night-time effect or to try and generate a sense of fear within a user by making the scene visually less welcoming.

Of course rather than applying such colour grading to a whole scene after rendering as in film production, it may reduce processing time and increase the quality of the applied effects to implement the changes in-engine. This means that content is rendered with the desired effects already applied, thus removing a step that would otherwise be implemented on the rendered image when generating an image for display.

Such methods may be advantageous in that they could be performed in real-time; this may be particularly useful in a gaming context or with any other interactive content as the views are generated in real-time in response to user actions.

Figure 7:
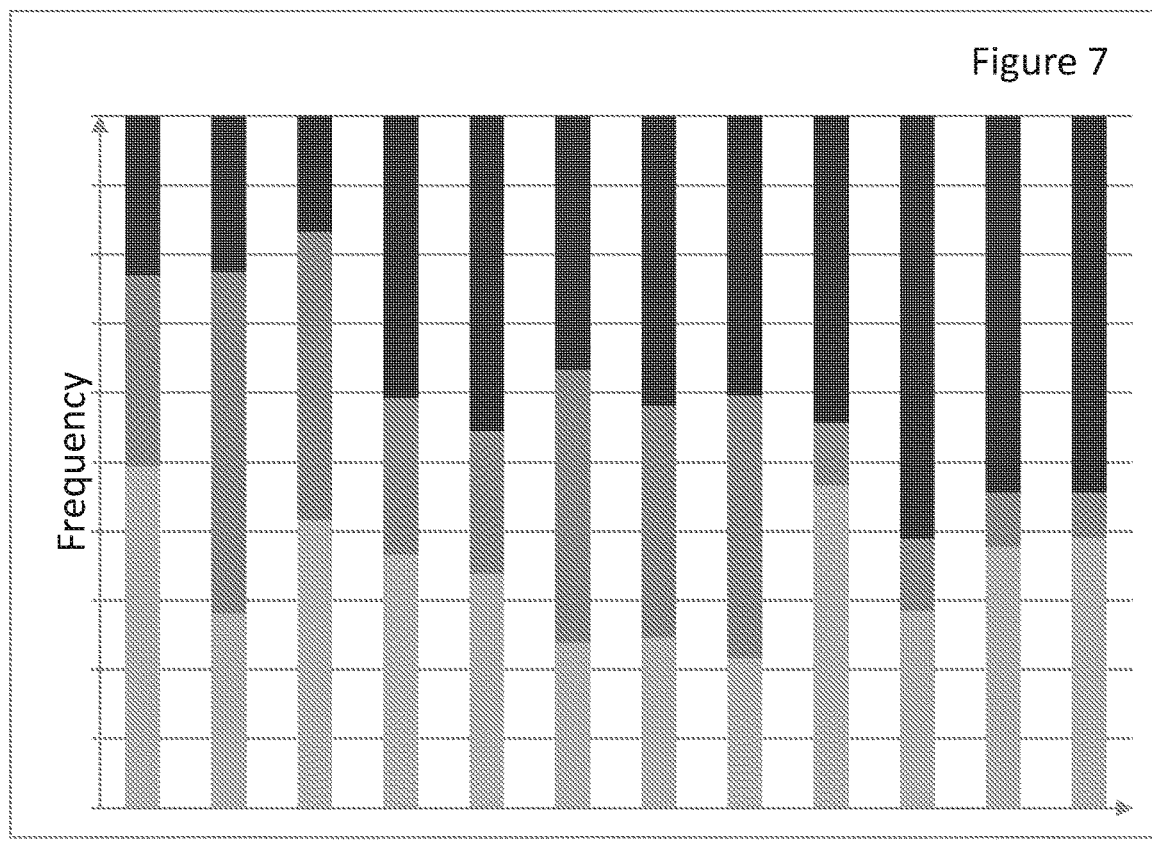
FIG. 7 schematically illustrates a modified colour data graph.

FIG. 7 shows a modified graph, comparable to that of FIG. 4. The graph of FIG. 7 is intended to represent the colour graded/tone mapped virtual scene of FIG. 6, although the actual distribution of colours may of course be entirely different. This graph shows that there is a greater intensity of higher frequency light in the virtual scene; this means that there are more blues, and fewer reds. This means that the scene may take an overall darker tone, as is shown in FIG. 6. This may be effective in communicating a greater sense of unease (for example) to the user than the same scene with a different colour palette.

Figure 8:
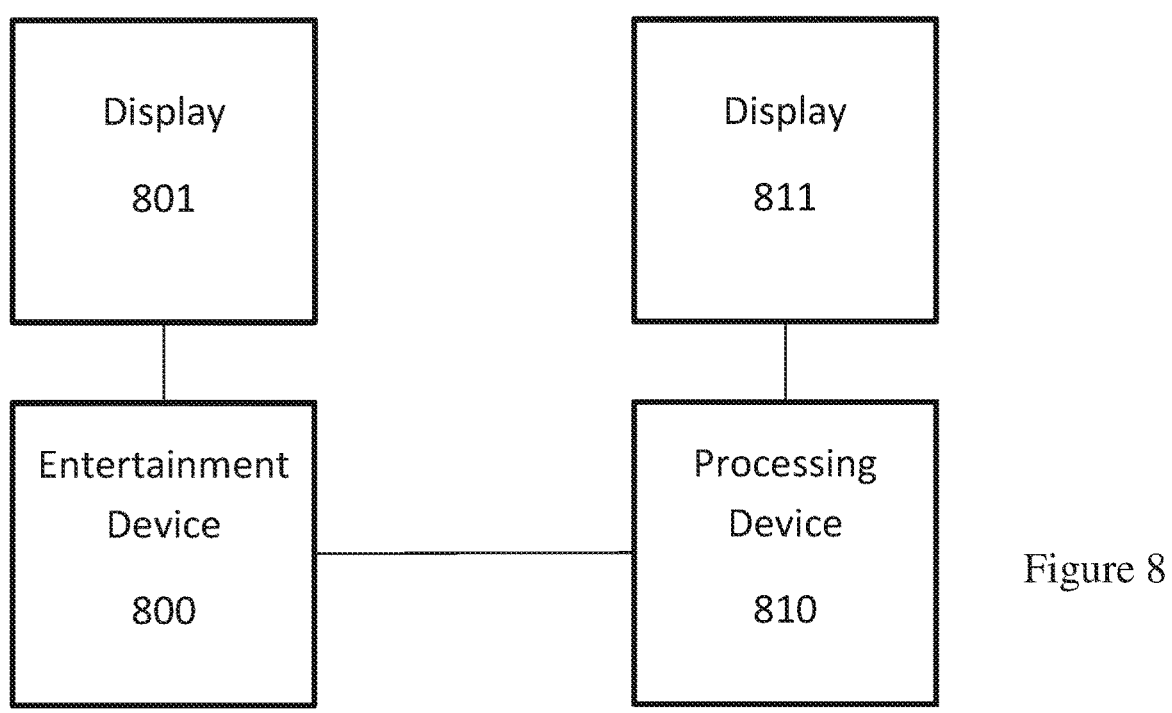
FIG. 8 schematically illustrates a content modification system.

FIG. 8 schematically illustrates a content generation system, comprising an entertainment device 800 and a processing device 810 with respective displays 801 and 811. The entertainment device 800 is the device that is used to reproduce the content, such as a Sony® PlayStation® 4 that is used to play games. The processing device 810 may be any device used to make changes to the content, such as a PC that runs software operable to edit the game engine. Each of the devices 800 and 810 are operable to output images to their respective displays 801 and 811. In such an arrangement, modifications to the content are input using the processing device and are implemented by the entertainment device.

It may be considered advantageous to perform modification of the content on a PC due to the greater range of available tools and the like; however, a problem associated with this is that the output and display of the content to a monitor associated with the PC is not identical to that of a console and television. This is especially true if the display 811 has a higher dynamic range (or the like) than the display 801; editing that makes use of this extra range will have no effect on the image as displayed on the display 801, as it is simply not capable of displaying the changes. As a result of this, the image that would be displayed to a user of the entertainment system 800 may not have the appearance desired by the content creator.

In the present arrangement, it is envisaged that the entertainment device 800 may be used to generate the output to the associated display 801 rather than using the processing device 810 as the video output device. The entertainment device 800 is used to execute the content, and can be controlled (or is operable) to register camera views; this comprises the recording of a current viewpoint and any metadata that may be required to reconstruct the scene at a later time.

Alternatively, or in addition, information describing the whole scene could be recorded so as to allow a virtual environment to be reconstructed in its entirety. The processing device 810 could be used to control the display by the entertainment device 800; for example, requesting particular images be displayed, restoring earlier views, providing update tone-mapping and colour grading values.

The processing device 810 is operable to receive the registered camera views and perform processing on them in order to preview effects and changes; real-time output of the same camera view (with the processing applied) by the entertainment device 800 may be used in parallel for displaying a preview on the display 811 associated with the processing device 810. The parallel display of content may be advantageous as the user is able to edit the content on a more appropriate device whilst being able to review changes on the intended output device, so as to be able to view the processed content as it would be experienced by an end user.

In some embodiments, the processing device 810 is operable to provide a tool that allows for communication to be performed with a runtime component on the entertainment device 820. This tool is capable of receiving information about the virtual scene (as described above), and would allow for the editing of the content. Information describing the changes that are made (such as a change in colour grading values) is communicated by the tool to the runtime component, which implements the changes in the game code.

While the processing could be performed during gameplay, it may be preferable to perform such methods during a debug or editing mode so as to allow the editor to manipulate in-game objects (such as moving light sources, as discussed above). While this could be performed during gameplay, it may be disruptive to a player's gameplay experience and so it may be preferable to avoid this.

Figure 9:
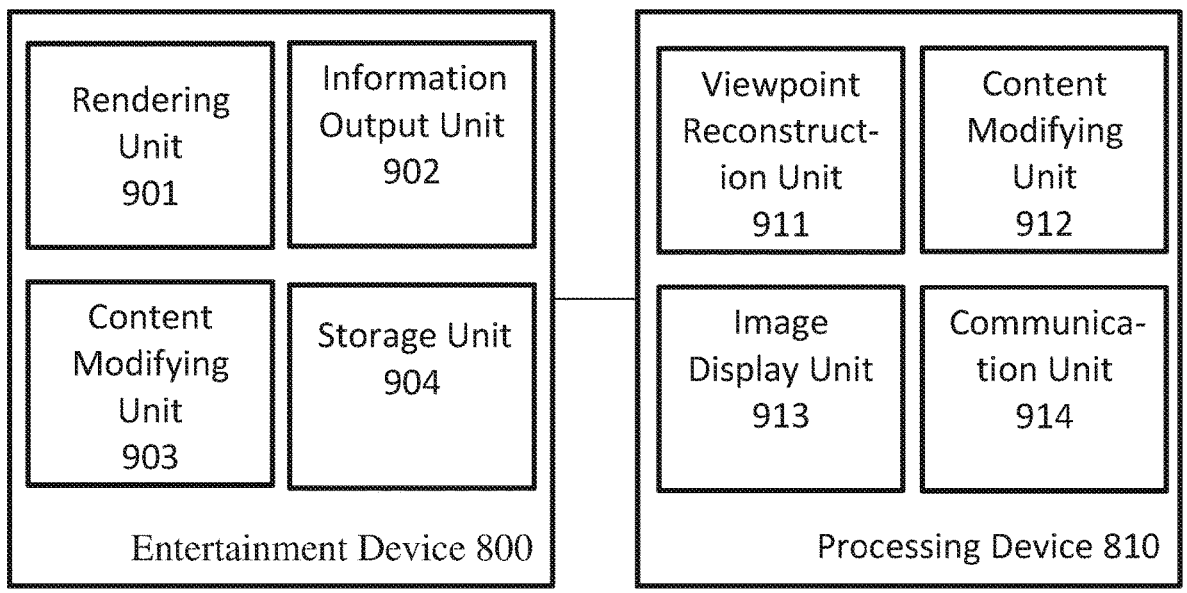
FIG. 9 schematically illustrates a content modification device.

FIG. 9 schematically illustrates a content modification system 900, comprising entertainment device 800 and processing device 810. The entertainment device 800 comprises a rendering unit 901, an information output unit 902, a content modifying unit 903 and a storage unit 904. The processing device 810 comprises a viewpoint reconstruction unit 911, a content modifying unit 912, an image display unit 913 and a communication unit 914.

While shown at particular devices, the functions of the units shown may be performed at either of the devices (or indeed by a third device) where appropriate. In some embodiments, it is envisaged that all of the functions may be performed by a single device. In particular, the content modifying units 903 and 912 may comprise two separate units (as shown), or may be formed as a single unit at either of the devices 800 and 810 and perform the functionality of each of the content modifying units shown in the Figure.

The rendering unit 901 is operable to render an image for display in dependence upon content to be rendered. During an editing process, the rendering unit 901 may be controlled to show the same viewpoint as that generated by the viewpoint reconstruction unit 911; this is an example of the entertainment device 800 and processing device 810 being operable to display content in parallel.

The information output unit 902 is operable to output viewpoint data for the rendered images, the viewpoint data comprising information enabling the viewpoint to be reconstructed at a later time.

The content modifying unit 903 located at the entertainment device 800 is operable to perform local changes to the content; for example, making changes to the game code or the like to implement the changes requested via the processing device 810.

The storage unit 904 is operable to store the content and any related information, such as software used to implement the methods described in this document.

The viewpoint reconstruction unit 911 is operable to generate an image to be displayed using the outputted viewpoint data. This may comprise an entire virtual scene, or simply a screenshot of the viewpoint that was previously rendered by the entertainment device 800.

The content modifying unit 912 is operable to modify the content to be rendered, for example by providing instructions to the entertainment device. Such instructions may be used to control the operation of the content modifying unit 903, for example, or to directly manipulate the game code stored in the storage unit 904.

The content modifying unit 912 may be operable to change the location and/or light output characteristics of objects within a virtual scene described by the content to be rendered, or may be operable to apply a colour grading and/or tone mapping effect to the content to be rendered, for example.

The image display unit 913 is operable to generate an image for display on the display unit 811; this may comprise a screenshot of a rendered view and any editing tools, for example.

The communication unit 914 is operable to transmit data to the entertainment device 800, such as data identifying how the content should be edited.

Figure 10:
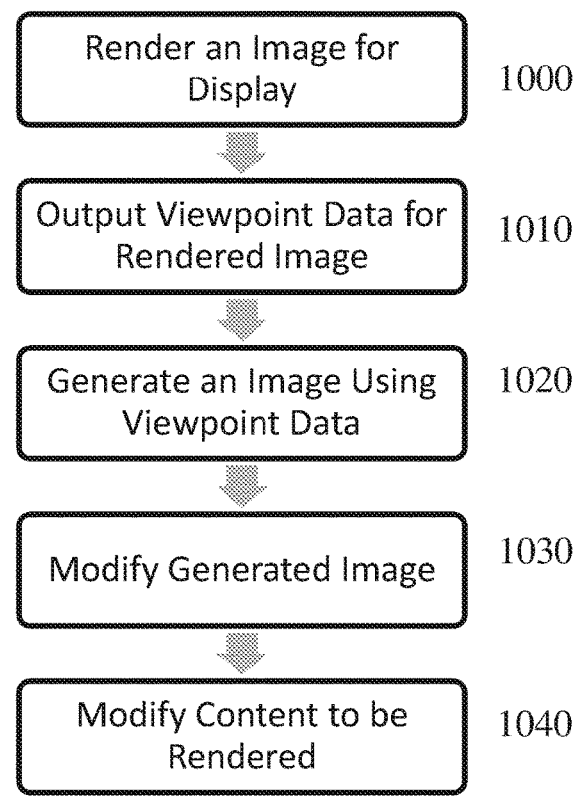
FIG. 10 schematically illustrates a content modification method.

FIG. 10 schematically illustrates a content modification method for modifying computer-generated content, the method comprising steps 1000 to 1040.

A step 1000 comprises rendering an image for display in dependence upon content to be rendered.

A step 1010 comprises outputting viewpoint data for the rendered image, the viewpoint data comprising information enabling the viewpoint to be reconstructed at a later time.

A step 1020 comprises generating an image to be displayed using the outputted viewpoint data.

A step 1030 comprises modifying the generated image.

A step 1040 comprises modifying the content to be rendered in dependence upon the modifications to the generated image.

In summary, this method allows for the modification of a generated image (such as an image displayed on a screen) to change the information that is used to generate at least that image. This may then more easily allow the modification to be reflected more widely in the content with which the image is associated—for example, the modifications may be made such that all of the images generated for a particular scene or in-content location may also show the same modification.

To use an example provided above, a change in the brightness of a displayed image may be implemented by moving a light source, or modifying the output of light sources. In this case, the displayed image is the generated image modified in step 1030, while the modification of the content to be rendered would be the change in the parameters associated with light sources. Of course, as described above, the modification of the content to be rendered may comprise a modification of program code directly.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A content modification system for modifying computer-generated content, the system comprising:
    a rendering unit operable to render an image for display in dependence upon content to be rendered;
    an information output unit operable to output viewpoint data for the rendered image, the viewpoint data comprising information enabling the viewpoint to be reconstructed at a later time;
    a viewpoint reconstruction unit operable to generate an image to be displayed using the outputted viewpoint data;
    an image modifying unit operable to modify the generated image; and
    a content modifying unit operable to modify the content to be rendered in dependence upon the modifications to the generated image,
    wherein the content modifying unit is operable to apply a colour grading and/or tone mapping effect to the content to be rendered.

2. A system according to claim 1, wherein the viewpoint data comprises information describing lighting conditions within a virtual scene described by the content to be rendered.

3. A system according to claim 2, wherein the information describing lighting conditions is represented by data that comprises information about a plurality of related viewpoints.

4. A system according to claim 1, wherein the rendering unit is located in an entertainment device, and the viewpoint reconstruction unit is located in a separate processing device.

5. A system according to claim 4, wherein the entertainment device and the processing device are operable to display content in parallel.

6. A system according to claim 4, wherein modifications to the content are input using the processing device and are implemented by the entertainment device.

7. A system according to claim 1, wherein the content modifying unit is operable to change the location and/or light output characteristics of objects within a virtual scene described by the content to be rendered.

8. A system according to claim 1, wherein the viewpoint data comprises a screenshot of the rendered view.

9. A system according to claim 1, wherein virtual cameras each defining a viewpoint are arranged within a virtual scene described by content to be rendered.

10. A system according to claim 9, wherein the virtual cameras are arranged to represent the most common viewpoints within the virtual scene.

11. A system according to claim 1, wherein the modification of the content to be rendered is dependent on a viewpoint for which the content is to be rendered.

12. A content modification method for modifying computer-generated content, the method comprising:
    rendering an image for display in dependence upon content to be rendered;
    outputting viewpoint data for the rendered image, the viewpoint data comprising information enabling the viewpoint to be reconstructed at a later time;
    generating an image to be displayed using the outputted viewpoint data;
    modifying the generated image; and
    modifying the content to be rendered in dependence upon the modifications to the generated image,
    wherein the modifying the content includes applying a colour grading and/or tone mapping effect to the content to be rendered.

13. A machine-readable non-transitory storage medium which stores computer software, which when executed by a computer, causes the computer to perform a content modification method for modifying computer-generated content by carrying out actions, comprising:
    rendering an image for display in dependence upon content to be rendered;
    outputting viewpoint data for the rendered image, the viewpoint data comprising information enabling the viewpoint to be reconstructed at a later time;

generating an image to be displayed using the outputted viewpoint data;

modifying the generated image; and modifying the content to be rendered in dependence upon the modifications to the generated image, wherein the modifying the content includes applying a colour grading and/or tone mapping effect to the content to be rendered.

* * * * *